T. J. LITLE, Jr.
GUARD FOR INVERTED INCANDESCENT MANTLES.
APPLICATION FILED JULY 29, 1911.
1,058,378.
Patented Apr. 8, 1913.
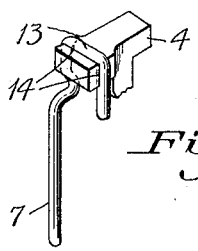
Fig.8.
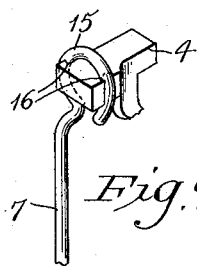
Fig.9.
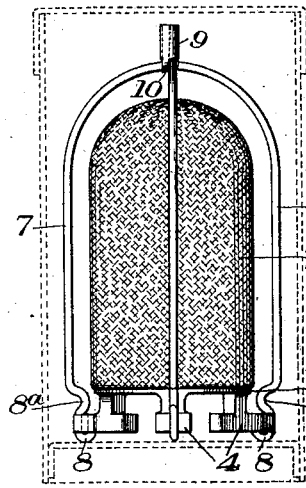
Fig.1.
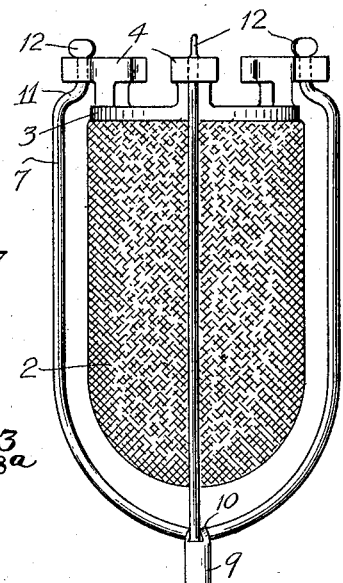
Fig.3. Fig.7.
Fig.2.
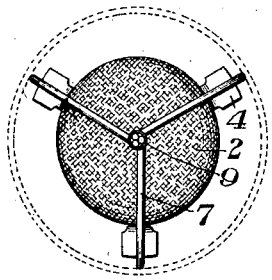
Fig.4.
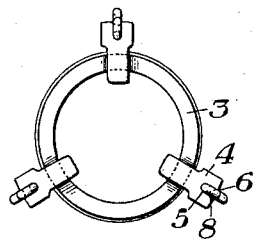
Fig.6.
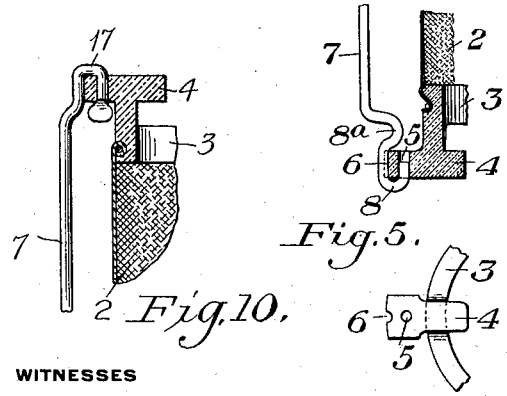
Fig.10. Fig.5.
WITNESSES
R A Balderson
W Tamariss
INVENTOR
T. J. Litle Jr.
by Bakewell, Byrnes Parmelee,
Attys.

UNITED STATES PATENT OFFICE.

THOMAS JAMES LITLE, JR., OF WOODBURY, NEW JERSEY, ASSIGNOR TO WELSBACH LIGHT COMPANY, OF GLOUCESTER CITY, NEW JERSEY, A CORPORATION OF NEW JERSEY.

GUARD FOR INVERTED INCANDESCENT MANTLES.

1,058,378. Specification of Letters Patent. Patented Apr. 8, 1913.

Application filed July 29, 1911. Serial No. 641,347.

*To all whom it may concern:*

Be it known that I, THOMAS J. LITLE, Jr., of Woodbury, Gloucester county, New Jersey, have invented a new and useful Improvement in Guards for Inverted Incandescent Mantles, of which the following is a full, clear, and exact description, reference being had to the accompanying drawings, forming part of this specification, in which—

Figure 1 is a side elevation of a mantle, with one form of my improved guard attached, showing the same incased in a box, which box is shown in dotted lines; Fig. 2 is a plan view of the same; Fig. 3 is an inverted plan view of a mantle ring and the guard; Fig. 4 is a partial sectional view through one of the legs of the mantle ring; Fig. 5 is a plan view of a portion of the mantle ring and one of the legs thereof; Fig. 6 is a perspective view of a tube for securing the ends of the guard member to each other; Fig. 7 is a view similar to Fig. 1, but showing a modification; and Figs. 8, 9 and 10 are detail views showing still other modifications in the manner of securing the guard members to the mantle ring.

My invention relates to mantles for inverted incandescent gas lamps, and is designed to provide a simple and efficient guard therefor which will protect the mantle both in shipping and handling, and will also provide a handle by which the mantle may be applied and removed without danger of injury thereto.

Another object of my invention is to provide a guard which is made up of a plurality of separate members, which can be independently connected to the legs of the mantle ring, after which the opposite ends of said members are secured together to form a rigid structure.

The precise nature of my invention will be best understood by reference to the accompanying drawings, which will now be described, it being premised, however, that various changes may be made in the details of construction, general form of the parts, and method of securing said parts to the mantle ring, without departing from the spirit and scope of my invention as defined in the appended claims.

In the drawings, the numeral 2 designates the mantle, which may be of the ordinary form for inverted incandescent lamps, its open end being secured to a refractory ring 3 having the integral radial legs or lugs 4. These prongs are usually spaced equidistantly about the ring, each being provided with an opening 5, which I have shown extending entirely through the legs, but it will be readily understood that these openings may only extend a sufficient depth to receive the ends of the hooks on the guard member as hereinafter described. The outer end of each leg is provided with a groove 6, for the purpose hereinafter described.

The guard is formed of three members 7, each of which has a hook member 8 at one end, and adjacent to this hook member is an inwardly bent portion $8^a$. The other end portion of each of these members 7 is bent inwardly in a radial direction, and then longitudinally at a point which is about coincident with the longitudinal center of the mantle. These ends are secured to each other by means of a tube 9, having projecting ends 10, which are clenched over the radially disposed portions of said members to retain the tube in proper position.

The guard is applied in the following manner:—The hook portion of each of the members 7 is first passed into one of the openings 5, and the members are then moved in a radial direction, after which the tube 9 is slipped over their other ends and is secured thereto, the tube retaining the ends of the members in proper position, and the bent projections retaining the tube in proper relation to the guard members. This tube is also arranged to form a handle for placing or removing the mantles. The grooves 6 in the legs are arranged to receive the outer portions of the hooks to prevent their rotating in the openings 5. The inwardly bent portions $8^a$ form stops to prevent upward movement of the guard members when the ends of said members are secured to each other.

It will readily be understood by those familiar with the art that the guard members may be changed in shape, and that they may be secured to each other and to the mantle ring in various ways.

In Fig. 7 I have shown a modification in which the guard members have offset end portions 11 which are inserted in holes in the ring lugs, and are secured therein by bending or flattening their upper ends as at 12; or by dropping cement around them.

Fig. 8 shows a form in which the ends of the members are given U-bends 13 to engage slots 14 on opposite sides of the mantle ring lugs.

Fig. 9 shows another modification in which the guard member has an eye 15 to engage the mantle ring lugs, the latter having groove 16 to receive the eye.

Fig. 10 shows a modified form of hook 17, whose end may be secured by bending, upsetting, or cementing.

The advantages of my invention result from the simplicity and effectiveness of the guard, which may be readily and cheaply formed of a plurality of pieces of wire bent into proper shape, and secured to each other at one end after they have been placed in proper position with relation to the legs of the mantle ring. A further advantage results from the provision of a guard made up of a plurality of members, in which the separate members can be attached to the legs of the ring without endangering the fragile mantle from damage by the guard member when being applied to the mantle ring.

I am aware that it is old to provide a mantle with a guard of bail shape; and in this construction of guards great care must be exercised when securing the first leg of the guard to one of the mantle ring legs to avoid injury to the mantle by the free or loose end.

I claim:—

1. An inverted mantle having a supporting ring, a guard formed of a plurality of wire members, a hook on one end of each of said members for connecting the guard to the ring, bent projections on said wire members below said hooks for preventing displacement of said guard, and means for securing the other ends of the wire members to each other; substantially as described.

2. An inverted mantle having a guard formed with a plurality of members having means at one end engaging the lugs of the mantle ring, a sleeve for securing the other ends of said members to each other, and means for securing the sleeve to said members; substantially as described.

3. An inverted mantle having a guard formed with a plurality of members, each having a hook at one end, there being openings through the lugs on the mantle ring for receiving said hooks, downwardly extending projections on the other ends of each of said members, a sleeve engaging said projections, and means for securing the sleeve to said members; substantially as described.

4. An inverted mantle having a guard formed with a plurality of members, each having a hook at one end, there being openings through the lugs on the mantle ring for receiving said hooks, downwardly extending projections on the other ends of each of said members, a sleeve engaging said projections, and bendable projections on the sleeve arranged to be bent around said members; substantially as described.

5. An inverted mantle having a ring formed with lugs, and a mantle guard having a plurality of guard members formed with means which engage the said lugs, the lugs having exterior grooves to receive the adjacent portions of the guard members; substantially as described.

6. An inverted mantle having a ring formed with openings therein, and a mantle guard having a plurality of guard members formed with hooks which engage the said openings vertically, said ring being provided with lugs having exterior grooves to receive the outer portions of the hooks, said hooks having inwardly bent stop portions; substantially as described.

7. An inverted mantle having a supporting ring provided with openings, a guard formed of a plurality of wire members extending from the ring to a point below the center of the mantle, a hook on the upper end of each of said members extending into the openings in the mantle ring, bent projections on said wire members below the hooks engaging the mantle ring, and means for securing the lower ends of the wire members to each other; substantially as described.

8. A mantle having a guard composed of a plurality of separate members built up around the mantle to form a protecting cage therefor, said members being rigidly secured at one end to the mantle ring to prevent movement of the guard relatively to the mantle and being brought together and detachably united at their opposite ends, substantially as described.

9. A mantle having a guard composed of a plurality of separate members built up around the mantle to form a protecting cage therefor, said members being rigidly secured at one end to the mantle ring to prevent movement of the guard into contact with the mantle and the other ends of the members being brought together at the opposite end of the mantle, and a securing device uniting these ends, substantially as described.

In testimony whereof, I have hereunto set my hand.

THOMAS JAMES LITLE, Jr.

Witnesses:
P. M. DEVLEY,
R. B. WASHINGTON.